No. 897,102. PATENTED AUG. 25, 1908.
J. M. HICKEY.
REGISTER AND ALARM FOR GRINDING MILLS.
APPLICATION FILED MAR. 1, 1904.
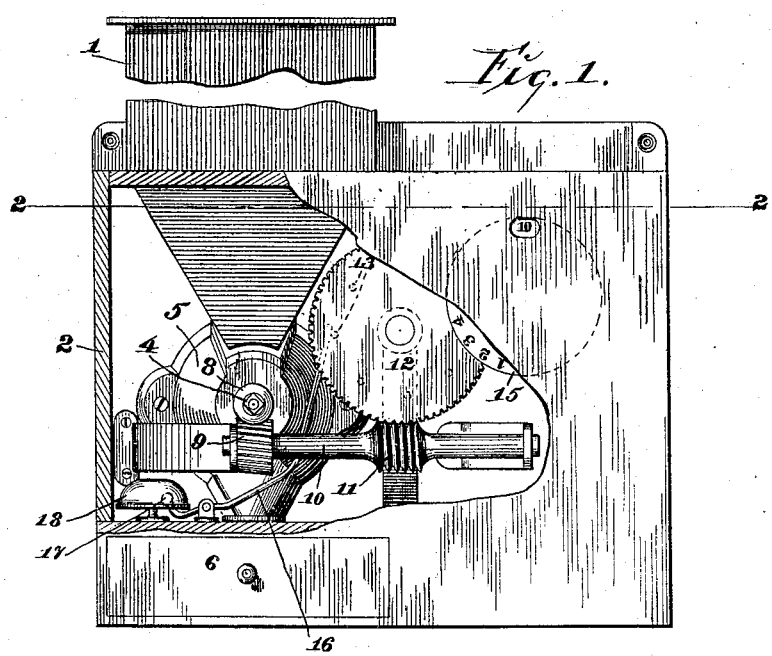
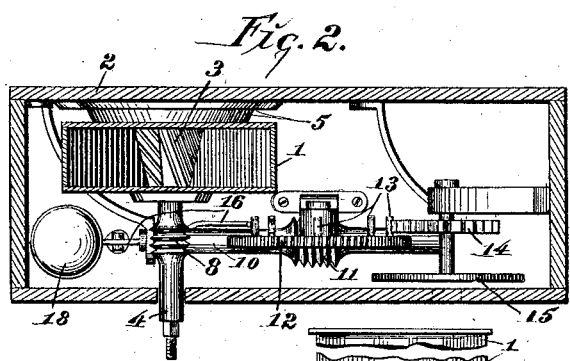
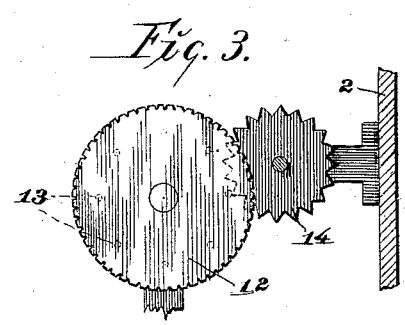
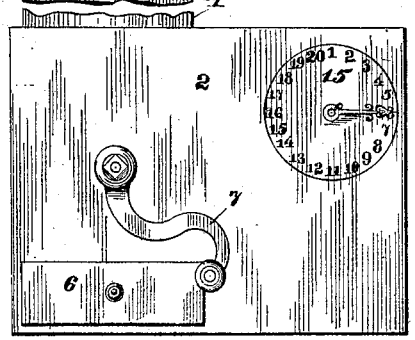
WITNESSES:
Paul A. Blair
S. E. Dallinger
INVENTOR
John M. Hickey
BY
Julian C. Dowell
his ATTORNEYS.

UNITED STATES PATENT OFFICE.

JOHN M. HICKEY, OF IRONTON, OHIO.

REGISTER AND ALARM FOR GRINDING-MILLS.

No. 897,102.　　　　　Specification of Letters Patent.　　　Patented Aug. 25, 1908.

Application filed March 1, 1904. Serial No. 196,079.

*To all whom it may concern:*

Be it known that I, JOHN M. HICKEY, a citizen of the United States, residing at Ironton, in the county of Lawrence and State of Ohio, have invented certain new and useful Improvements in Registers and Alarms for Grinding-Mills; and I do hereby declare the following to be a full, clear, and exact description of the invention, such as will enable others skilled in the art to which it appertains to make and use the same.

My invention consists of an improved domestic mill, such as a coffee-mill, having incorporated in its construction a combined quantitative register and alarm mechanism, the objects of which are to automatically register the amount of stock ground, without weighing or measuring, and to notify the operator after having ground a predetermined or regularly desired amount, and also to allow for varying the amount ground before such warning is given to the operator.

The invention will first be described with reference to the accompanying drawings, which are to be taken as a part of this specification, and then pointed out more particularly in the annexed claims.

In said drawings: Figure 1 is a side elevation of a coffee-mill embodying my invention, with a part of the casing broken away to disclose the registering and alarm mechanism. In this figure the index dial is located within the box or casing and shows through an opening the number corresponding to the measurement ground. Fig. 2 is a longitudinal section on line 2—2 of Fig. 1. Fig. 3 is a detail view of a part of the mechanism. Fig. 4 is a side elevation of the box or casing, showing the grinding handle and a dial and point located on the outside.

Referring to the drawings by specific reference numerals, 1 represents the coffee box or hopper which may be of any suitable size or shape adapted to hold a considerable quantity of unground coffee, and provided with a removable lid or cover. This hopper is shown mounted on a box or casing 2, and has within said box a lower contracted spout or funnel-shaped bottom adapted to feed the coffee into the grinder. Said box 2 contains the grinding, registering and alarm mechanisms.

The particular grinder shown consists of a ribbed metallic cone 3 mounted on the grinding-shaft 4 and rotating within a hollow stationary conical shell 5 secured to the side of the box 2, and similarly ribbed interiorly. The shell 5 has an opening in the bottom through which the ground coffee falls into a suitable drawer or receptacle 6 below. The grinder may be operated by a detachable crank 7 at the end of the shaft 4 on the outside of the box 2.

On the shaft 4 is a worm or screw 8 which meshes with a pinion or worm-wheel 9 on a transversely disposed shaft 10 mounted in suitable bearings. This shaft has a worm-wheel 11 which meshes with a larger worm-wheel 12. Around the face of gear 12 are arranged in holes and equally distant apart several removable plugs or pins 13. These pins have two functions: one, to engage intermittently a star-wheel 14 which is secured to a dial 15 later described; the other, to engage a bell-hammer or gong-actuating lever 16, having a short arm provided with a hammer or knocker 17 adapted to ring a bell 18. These pins are so located that they will trip the hammer only after a certain number of revolutions of the crank, which number of turns determines the grinding of one ounce, or other fractional part of a pound, or other unit of measure, of the coffee. Accordingly by having a pin in each hole the bell will ring at the completion of each ounce or other unit of weight ground. By removing every other pin the bell will ring at every two ounces or units; and thus by proper adjustment of the pins any number of ounces can be ground before a warning is given. The dial 15, attached to and revolving with the star-wheel 14, with which the pins 13 engage, is located within the box 2, and has consecutive numbers about its edge, which denote the number of ounces or other desired amounts ground, and which appear through an opening in the side of the box, as represented in Fig. 1. But if desired the dial may be placed outside the box and a pointer attached to show at the grinding of what amount the alarm-bell is set to ring and notify the operator of the same.

Other minor changes may be made without avoiding the principle of this invention. Moreover, while I have by way of example described my invention as embodied in a coffee-mill, it is obvious of course that it is equally applicable to machines for grinding other materials.

I claim as my invention and desire to secure by Letters Patent of the United States:

1. In a register mechanism, the combination with the shaft, of a gear, driven by said shaft, said gear having spaced pins on its face, a parallel star-wheel arranged to be intermittently engaged by said pins, a rotary indicator operatively-connected with said star-wheel, a lever also arranged to be engaged by said pins, and a gong and hammer for striking the same, said hammer being actuated by said lever.

2. In a register mechanism, the combination of a shaft having a worm 8 thereon, a transversely disposed shaft 10 having a pinion 9 in mesh with said worm, said shaft 10 also having a worm 11 thereon, a gear 12 in mesh with said worm 11, said gear having space-pins 13 on its face, a star-wheel 14 arranged to be intermittently engaged by said pins, and an indicator operatively-connected with said star-wheel.

3. In a register mechanism, the combination with the shaft, of a gear operatively connected with and to be driven by said shaft, a parallel star wheel sustained for rotation adjacent said gear, a rotary indicator operatively connected with said star wheel, *indicia* in conjunction with said indicator, and a series of spaced pins detachably engaged with one face of the gear and arranged to intermittently engage the points of the star wheel for actuating the same, the detachability of said pins permitting spacing of them for determinately varying the number of revolutions of the star wheel with respect to the gear.

4. In a register mechanism, the combination with the shaft, of a gear driven by said shaft, a parallel star wheel sustained for rotation contiguous to the gear, a rotary indicator operatively connected with said wheel, and an alarm mechanism including a gong and a movable lever operable for actuating said gong and a series of relatively spaced pins detachably and adjustably engaged with the gear and arranged for intermittent engagement with the points of the star wheel and with the gong actuating lever for operating said parts.

In testimony whereof I affix my signature, in presence of two witnesses.

JOHN M. HICKEY

Witnesses:
 LYTTA E. CORNS,
 JOHN A. JOHNSON.